(12) United States Patent
Liu

(10) Patent No.: US 8,225,686 B2
(45) Date of Patent: Jul. 24, 2012

(54) CHIPS DISCHARGEABLE WIPER

(75) Inventor: Chia-Min Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 442 days.

(21) Appl. No.: 12/545,804

(22) Filed: Aug. 21, 2009

(65) Prior Publication Data

US 2010/0000353 A1 Jan. 7, 2010

Related U.S. Application Data

(63) Continuation-in-part of application No. 11/382,728, filed on May 11, 2006, now abandoned.

(51) Int. Cl.
*F16H 3/06* (2006.01)
(52) U.S. Cl. .................................................... 74/89.4
(58) Field of Classification Search ............... 74/89.4, 74/89.41, 89.44, 424.71, 424.82, 424.86, 74/424.87; 277/550
See application file for complete search history.

(56) References Cited

U.S. PATENT DOCUMENTS

| | | | | |
|---|---|---|---|---|
| 3,678,776 A | * | 7/1972 | Patterson | 74/89.4 |
| 6,571,653 B1 | * | 6/2003 | Takeda et al. | 74/89.4 |
| 6,634,246 B2 | * | 10/2003 | Ohya et al. | 74/89.44 |
| 6,732,599 B2 | | 5/2004 | Michioka et al. | |
| 6,927,513 B2 | * | 8/2005 | Schreier | 74/89.23 |

* cited by examiner

*Primary Examiner* — James Pilkington

(57) ABSTRACT

A chips dischargeable wiper is disposed at the end of a nut, the wiper is defined with a flange, a plurality of ribs integrally formed with the flange, and a plurality of through holes located beside the flange. The flange is used to mate with the helical groove of the ball screw in such a manner that a rib is formed on the flange, which not only can reduce the resistance of the wiper, but also can effectively prevent intrusion of foreign objects into the screw shaft and can prevent leakage of lubricating agent. Furthermore, the rib can collect dusts and the foreign objects and discharge them out of the through holes. Therefore, the structure of wiper is simplified and can be used for a long time without maintenance.

7 Claims, 6 Drawing Sheets

CHIPS DISCHARGEABLE WIPER

This application is a continuation of part of U.S. patent application Ser. No. 11/382,728, which claims the benefit of the earlier filing date of May 11, 2006 now abandoned. Claim 1 of this application is revised from claim 1 of the U.S. patent application Ser. No. 11/382,728, claims 2-6 this application correspond to the previous claims 2, 3, 4, 7 and 10 of the U.S. patent application Ser. No. 11/382,728, respectively, and claim 7 is new.

BACKGROUND OF THE INVENTION

1. Field of the Invention

The present invention relates to a ball screw, and more particularly to a chips dischargeable wiper that is disposed at the end of the nut, the wiper is simply structured for reduction of resistance, and not only can prevent intrusion of foreign objects but also can'prevent leakage of lubricating oil.

2. Description of the Prior Art

With the constant advancement of the precision feeding system, various linear transmission mechanisms, such as linear guideway, ball screw, etc, have come into existence in our everyday life, in manufacturing factories and in high-tech society. Above all, large-scale precision mechanisms are usually equipped with ball screws (either large or small), or linear guideway systems. Although the technology for linear transmission element is developing fast, consumers still expect optimum to come. Therefore, improvements have to be made. Such a desire for constant improvement of technology is quite strong in many high precision mechanism-manufacturing fields (such as wafer process equipment, CNC equipment, etc) that require more stability and less noise. For this matter, the existing linear mechanism needs a better solution.

A commonly used conventional ball screw is shown in FIG. 1, a nut 12 with a wiper 11 is disposed at either end of the nut 10, the wiper 11 is provided with a protruding edge 111 for preventing intrusion of foreign objects or loss of lubricating agent. However, in order to compensate the manufacturing error, an interval (approximately 0.25 mm) is usually reserved between the protruding edge 111 of the wiper 11 and the helical groove 101 of the screw shaft 10, plus the manufacturing error will further increase the reserved interval. According to the data well known in the art, that any foreign object whose size is larger than 0.17 mm will cause damage to the ball screw. Therefore, the reverse interval (approximately 0.25 mm) will have the problem of the intrusion of foreign objects and the loss of lubricating agent.

At this moment, in order to have a better scraping effect, a part of the protruding edge 111 as shown in FIG. 1 can be designed such that it is radially moveable, and an elastic member 112 is arranged in the protruding edge 111 for enabling the wiper 11 to press closely against the surface of the helical groove 101 of the screw shaft 10. However, the manner of pressing the surface of the wiper 11 completely against the surface of the helical groove 101 will substantially increase the friction therebetween, causing a great reduction in the mechanical efficiency of the ball screw. Furthermore, a large number of foreign objects will be likely to accumulate in the contacting area between the wiper 11 and the helical groove 101.

In view of the aforesaid reasons, the existing improvements to the linear transmission type ball screw generally involves the following two methods:

A. As shown in FIG. 2, the wiper 13 also uses its protruding edge 31 to prevent the intrusion of foreign objects and the loss of lubricating agent. In addition, a spring coil 14 is disposed behind the protruding edge 31 for increasing the radial clamping force thereof, and the protruding edge 31 are defined with a plurality of notches 132 in order to reduce friction. However, such design has a problem that, during rotation, foreign objects will rapidly accumulate in and block the notches 132 (in the feeding direction), and the foreign objects will always reside on the screw shaft. Besides, the radial clamping force 14 of the spring coil 14 will substantially increase the friction of the protruding edge 131, causing a great reduction in mechanical efficiency of the ball screw. The spring coil will also be loosened by abrasion, causing resistances and instability in foreign-objects preventing effect.

B. As shown in FIG. 3, which shows a wiper structure disclosed by U.S. Pat. No. 6,732,599, wherein the wiper 15 is disposed between the nut and a stopper, and a plurality of wiping plates 151 are annularly arranged on the wiper 15. Each of the wiping plates 151 is defined with a slant end 152 facing the helical groove of the screw shaft. By such arrangements, the slant ends 152 in the feeding direction will rotate forward and wipe off the foreign objects in the helical groove, and the slant ends 152 in the opposite direction will rotate backward without causing resistance. The aforesaid conventional product can achieve the function of wiping off the foreign objects under the condition of reducing the resistance. However, such design is too complicated and its assembly is difficult, and is unapplicable to small ball screws. Under the limitation of the cost and assembly, this design is impossible to meet the market's needs.

It is learned from the above that the conventional wiper must be cleaned, replaced or repaired periodically, otherwise, the accumulated foreign objects and grease will affect the operation of the ball screw.

The present invention has arisen to mitigate and/or obviate the afore-described disadvantages.

SUMMARY OF THE INVENTION

The primary objective of the present invention is to provide a chips dischargeable wiper that can reduce the resistance but also can prevent intrusion of foreign objects.

A plurality of ribs integral with and vertical to the flange are formed on the inner surface of the wiper, and a through hole is located correspondingly to each of the ribs. The comparatively small contacting surface of the ribs can reduce the friction to the wiper, and the protruding ribs can effectively wipe off the foreign objects in the helical groove and prevent leakage of lubricating oil. Plus, one of the two lateral surfaces of each of the ribs is recessed toward the center from both ends thereof to form the concave portion in the center thereof, which can collect dusts and then discharge via the through hole. Therefore, the present invention can be used for a long time without maintenance.

The secondary objective of the present invention is to provide a simply structured, easily installed chips dischargeable wiper.

The present invention can obtain the abovementioned effects simply by arranging a plurality of ribs on the inner surface of the wiper. The ribs are simply structured and will not excessively affect the assembly of the wiper. Hence, the chip-discharge wiper is an easily assembled and simply structured (low cost) structure.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

The foregoing, and additional objects, features and advantages of the present invention will become apparent from the following detailed description of preferred embodiments thereof, taken in conjunction with the accompanying FIGS. 4-7.

Figure 7:
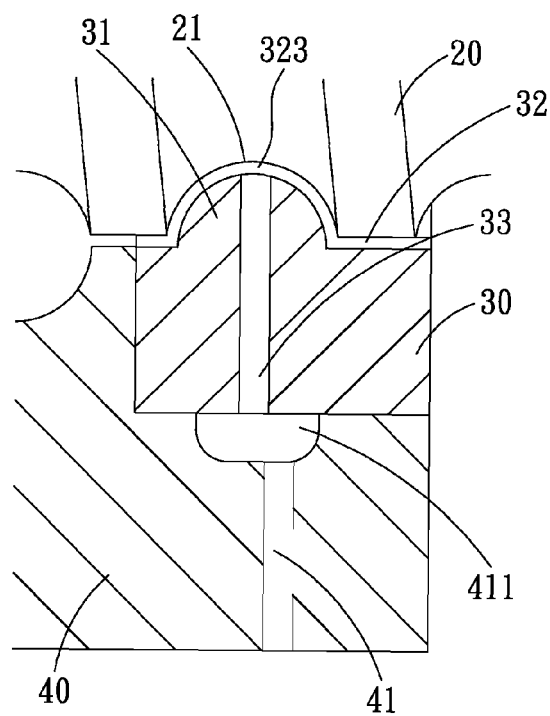
FIG. 7 is an assembly view of a part of the wiper in accordance with the present invention.

A chip discharge wiper 30 in accordance with the present invention and a nut 40 are mounted on a screw shaft 20 (an outer periphery of the wiper is fixed to the nut), its structure is explained below (the nut and the screw shaft structure are shown in FIG. 7)

The screw shaft 20 is formed on its surface with a helical groove 21, and the nut 40 is formed with threads for meshing with the helical groove 21. The wiper 30 is annular structure mounted on the screw shaft 20 and fixed at the end of the nut 40. A flange 31 is formed on an inner periphery of the wiper 30 and extends along a complementary helical path to match the helical groove 21, and an interval is formed between the flange 31 and the helical groove 21. On the flange 31 is formed at least one rib 32 which is an elongated block integral with the flange 31. The rib 32 is folded into a ←-shaped configuration and includes two lateral surfaces 321, 322 and two short lateral surfaces connected between the ends of the two lateral surfaces 321 and 322. The rib 32 has a thickness which is measured from a top surface of the flange 31 to the bottom of the helical groove 21. The first lateral surface 321 is slanted towards the center thereof to form a concave portion 323 in the center thereof, while the second lateral surface 322 of the rib 32 protrudes toward its center from both ends thereof. The thickness of the rib 32 is designed to match the interval between the flange 31 and the helical groove 21. A radial through hole 33 is formed in the flange 31 in such a manner that an end of the through hole 33 is located at the concave portion 323 of the rib 32, and another end of the through hole 33 is located at the outer circumference of the wiper 30.

Figure 8:
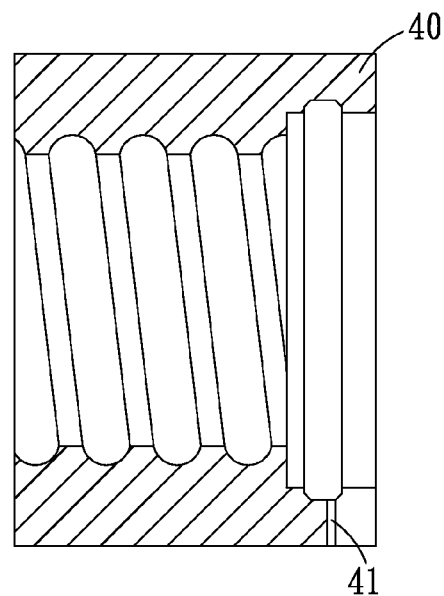
FIG. 8 is a cross sectional view of a nut in accordance with the present invention.
Figure 9:
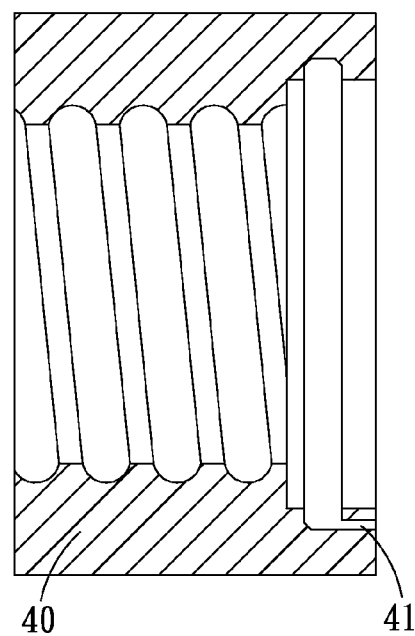
FIG. 9 is a cross sectional view of a nut in accordance with another embodiment of the present invention.

The nut 40 is mounted on the wiper 30 and is defined with a chips-discharging hole 41. At and end of the nut 40 is formed an annular connecting groove 411 for connecting the through hole 33 of the wiper 30. The chips-discharging hole 41 is defined in the axial surface or the radial surface of the nut 40 (with reference to FIGS. 8 and 9).

The wiper 30 is positioned in the nut 40 in such a manner that the flange 31 is engaged in the helical groove 21 of the ball screw 20. During linear motion, the screw shaft 20 will rotate with respect to the wiper 30. At this moment:

Although there is a formed interval between the flange 31 and the helical groove 21, the formed interval is sized not to allow the passage of the lubricating agent. Hence, the flange 31 can prevent the leakage of lubricating agent, ensuring a smooth operation of the present invention.

When the screw shaft 20 rotates relative to the wiper 30, the rib 32 on the flange 31 will move along the helical groove 21 to wipe off the foreign objects and dusts. Due to only the rib 32 contacts closely against the nut 40 and the screw shaft 20, the resistance of the present invention is not large and only exists on the surface of the rib 32. Hence, the mechanical efficiency of the present invention is maintained effectively.

At the same time, due to the rib 32 is folded in the center, the first lateral surface 321 of the rib 32 is a concave surface and formed with the concave portion 323 in the center thereof, the foreign objects and dusts wiped by the rib 32 along the helical groove 21 will be pushed to the concave portion 323. And then the foreign objects and dusts will be pushed into the through hole 33, the annular connecting groove 411 of the nut 40, and finally will be discharged via the chips-discharging holes 41 in the radial or axial surfaces of the nut 40.

In addition, on the surface of the flange 31 of the wiper is formed another rib 32 which is located at another end of the nut 40 and arranged in a reversed direction to the first flange 31. This rib 32 uses its second lateral surface 322 to wipe the foreign objects and dusts by moving along the helical groove 21.

Due to the second lateral surface 322 of the rib 32 is a convex structure, the foreign objects and dusts will be pushed out from the center by the rib 32 without being accumulated between the nut and the screw shaft. Therefore, the wiper of the present invention not only can prevent the intrusion of foreign objects but also can reduce the resistance.

Figure 10:
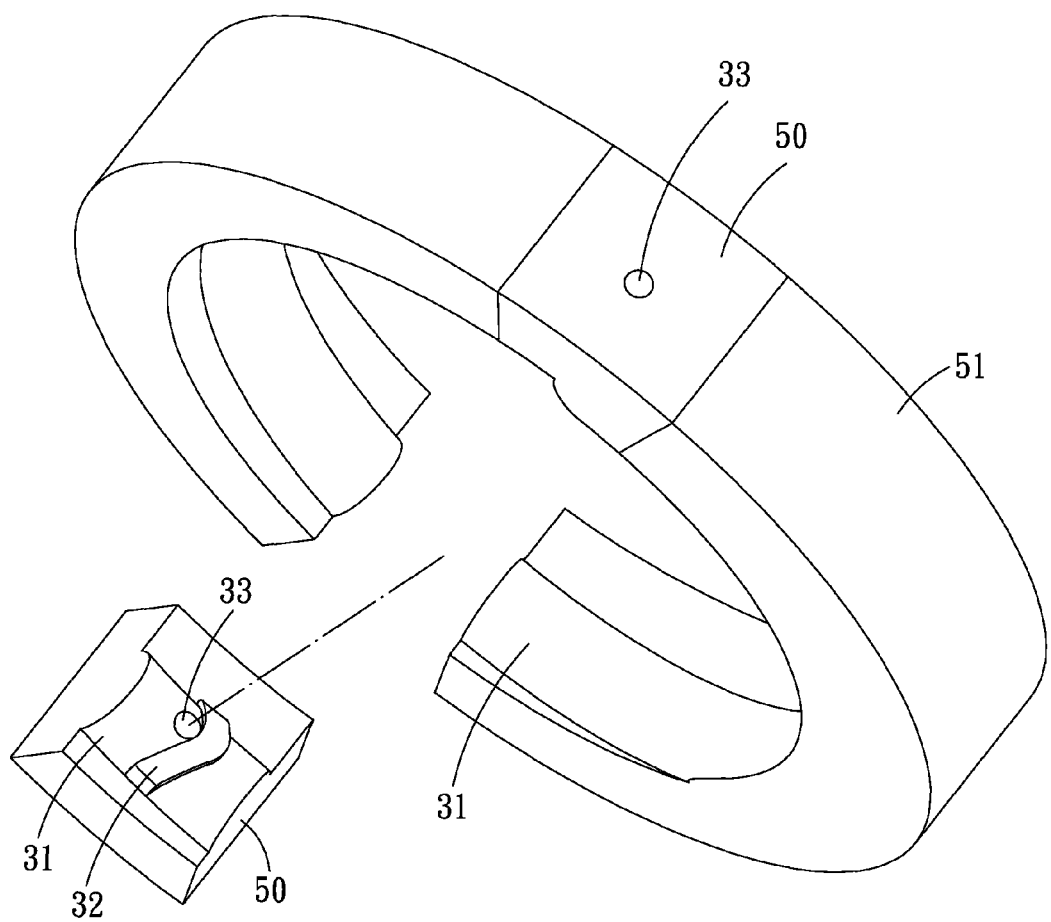
FIG. 10 is an exploded view of a wiper in accordance with a second embodiment of the present invention.

Finally, with reference to FIG. 10, the wiper 30 of the present invention is not limited to a unitary annular structure, and for easy assembly and production, the flange 31, the rib 32 and a chip-discharging section 50 (the arc section) of the through hole 33 also can be made separately. Complicated structures can be made first, and then the chip-discharging section 50 and the base section 51 (arc section) are assembled together to form a complete annular structure.

Figure 1:
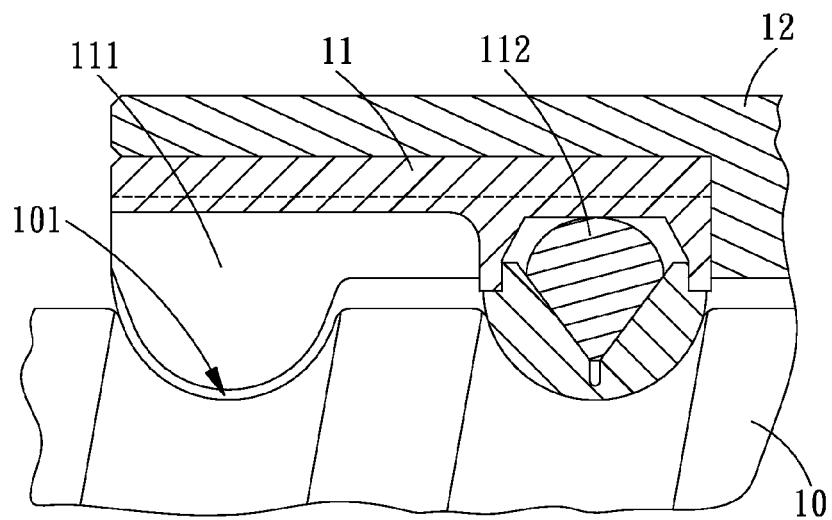
FIG. 1 is a cross sectional view of showing a conventional wiper.
Figure 2:
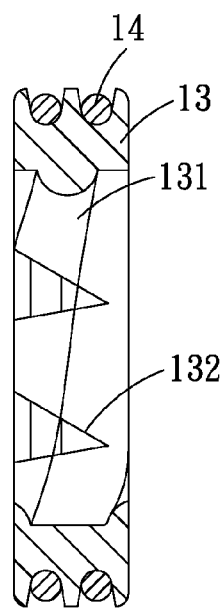
FIG. 2 is a cross sectional view of another conventional wiper.
Figure 3:
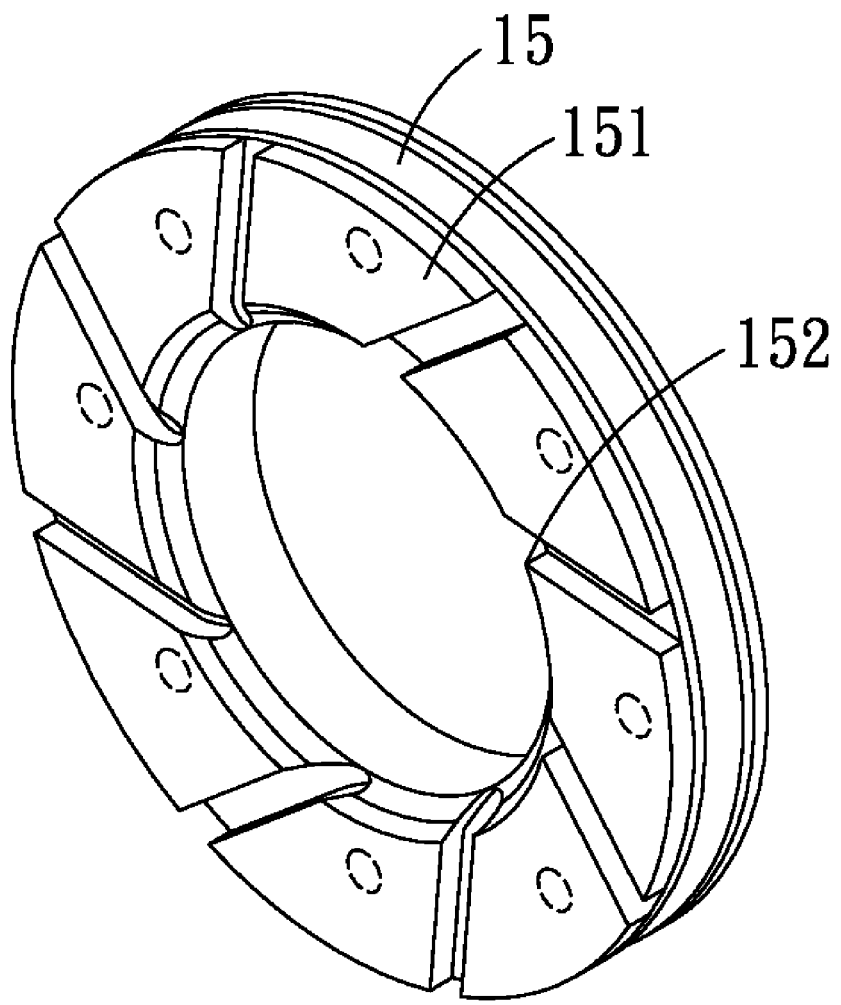
FIG. 3 is a perspective view of a third conventional wiper.
Figure 4:
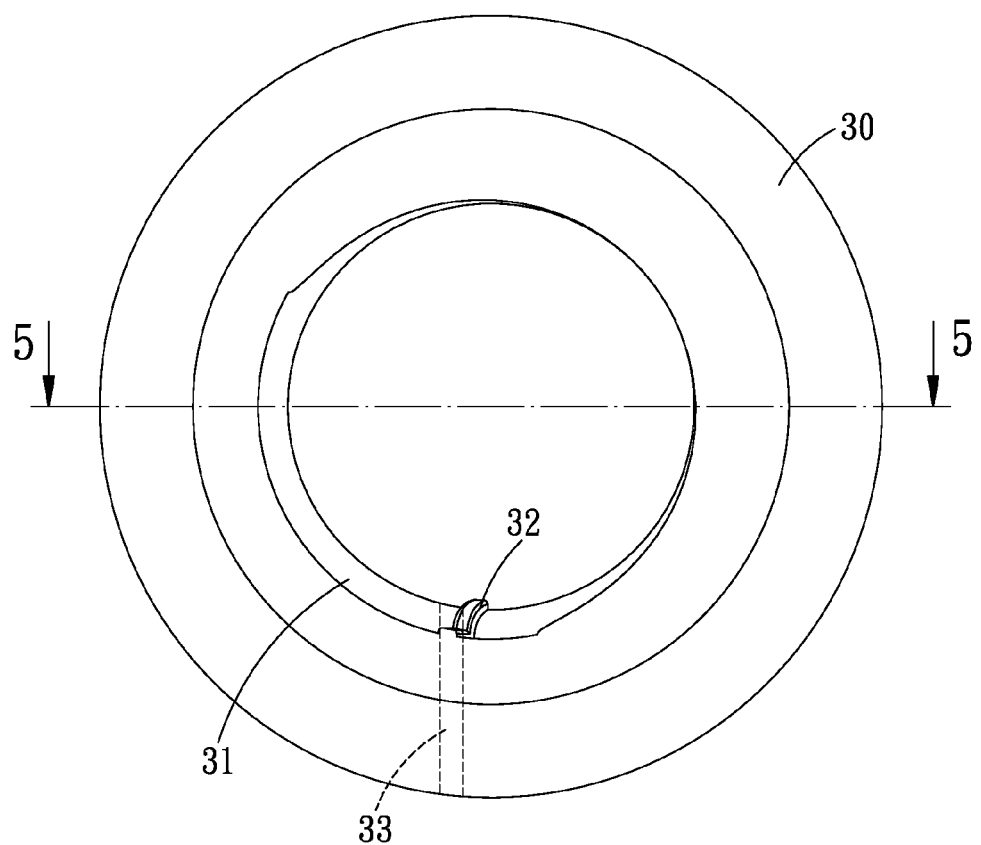
FIG. 4 is an illustrative view of a wiper in accordance with the present invention.
Figure 5:
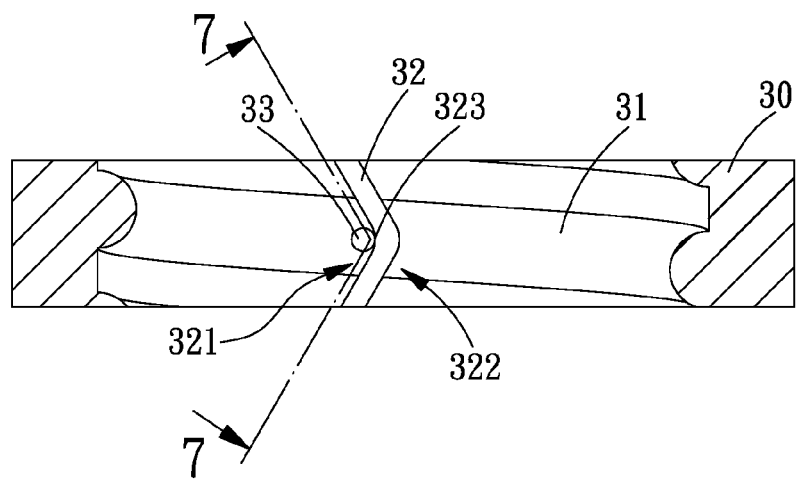
FIG. 5 is a cross sectional view of showing a wiper in accordance with the present invention.
Figure 6:
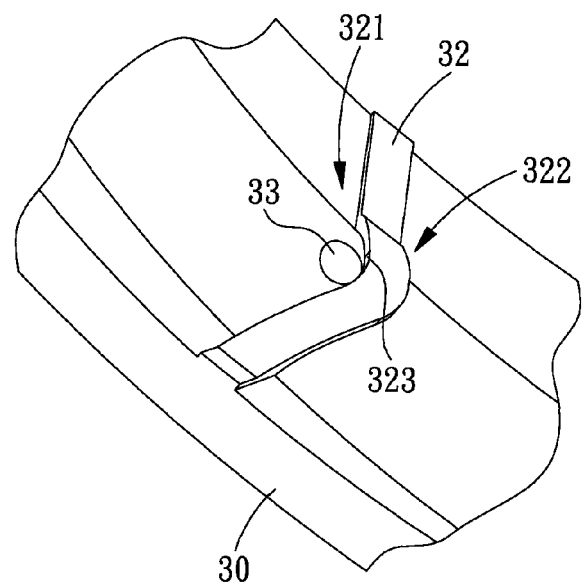
FIG. 6 is a stereographic view of a part of the wiper in accordance with the present invention.

Furthermore, the rib 32 on the flange 31 of the wiper 30 can run along the entire width of the inner surface of the wiper 30, as shown in FIG. 5, or can also only run along the width of the flange 31, as shown in FIG. 10.

Therefore, not only the rib 32 and the through hole 33 can be formed or assembled easily but separately. Hence, the chip-discharge wiper is an easily assembled and simply structured (low cost) structure.

Figure 11:
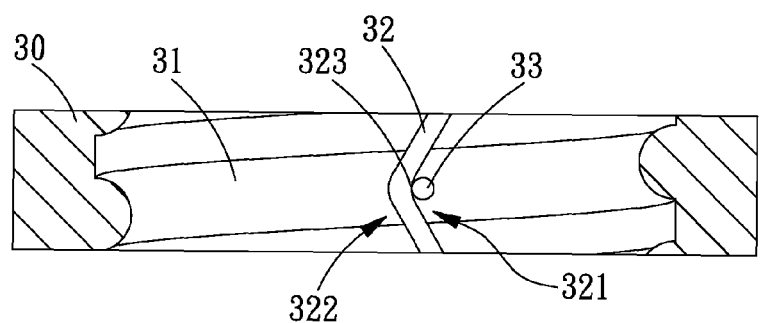
FIG. 11 shows a flange of the wiper in accordance with a third embodiment of the present invention arranged in a reversed direction to the flange shown in FIG. 5.

The flange 31 of the wiper 30 is arranged according to the rotating direction of the helical groove 21 of the screw shaft 20, namely, the helical groove 21 of a screw shaft 20 can be left or right rotated, so that the flange 31 of the wiper 30 can also be left or right rotated according to the rotating direction of the helical groove 21. For example, FIG. 5 shows a rotating direction of the flange 31 of the wiper 30, and FIG. 11 shows another rotating direction of the flange 31 of the wiper 30 which is reverse to the rotating direction of the flange 31 of the wiper 30 as shown in FIG. 5.

To summarize, the innovated design of the present invention is installed in the nut of the ball screw, the wiper is defined with a flange, a plurality of ribs integrally formed with and vertical to the flange, and a plurality of through holes located beside the flange. The flange is used to mate with the helical groove of the ball screw in such a manner at least a rib tapered from outside in is disposed between the flange and the screw shaft, which not only can reduce the friction of the wiper, but also can effectively prevent intrusion of foreign objects into the screw shaft and can prevent leakage of lubricating agent. Furthermore, the rib can collect dusts and the foreign objects and discharge them out of the through holes.

While we have shown and described various embodiments in accordance with the present invention, it should be clear to those skilled in the art that further embodiments may be made without departing from the scope of the present invention.

What is claimed is:

1. A chips dischargeable wiper disposed between a nut and a ball screw, the ball screw being formed with a helical groove for cooperating with the nut, an outer periphery of the chips dischargeable wiper being fixed to the nut, a flange extending along a complementary helical path to match the helical groove and being formed on an inner surface of the chips dischargeable wiper and shaped to fit in the helical groove of the ball screw, and an interval being formed between the flange and the helical groove, the chips dischargeable wiper being characterized in that:

on the flange is integrally formed at least one rib which is an elongated block running along a width of the flange, the rib has two lateral surfaces, one of the two lateral surfaces is slanted toward the center from both ends thereof to form a concave portion in the center thereof, so that foreign objects and dusts wiped by the rib along the helical groove are pushed from both ends of the rib to the center of the concave portion, and a thickness of the rib is designed to match the interval between the flange and the helical groove, wherein the thickness of the rib is measured from a top surface of the flange to a bottom of the helical groove.

2. The chips dischargeable wiper as claimed in claim 1, wherein the rib of the chips dischargeable wiper is folded in the center, the folded center being formed by the one of the two lateral surfaces of the rib that is slanted toward the center from both ends thereof to form the concave portion and the other lateral surface which protrudes toward the center from both ends thereof.

3. The chips dischargeable wiper as claimed in claim 1, wherein the chips dischargeable wiper is an annular structure divided into a plurality of arc sections and disposed between the nut and the screw shaft.

4. The chips dischargeable wiper as claimed in claim 1, wherein a through hole is formed in the flange in such a manner that an end of the through hole is located at the concave portion of the rib, and another end of the through hole is located at an outer circumference of the chips dischargeable wiper.

5. The chips dischargeable wiper as claimed in claim 4, wherein a chips-discharging hole is formed in the nut in such a manner that an end of the chips-discharging hole is connected to the through hole of the chips dischargeable wiper and another end of the chips-discharging hole is formed in a radial surface or an axial surface of the nut.

6. The chips dischargeable wiper as claimed in claim 5, wherein an annular connecting groove is formed at an end of the nut for connecting the through hole of the chips dischargeable wiper to the chips-discharging hole.

7. The chips dischargeable wiper as claimed in claim 1, wherein the rib runs along a width of the chips dischargeable wiper.

* * * * *